United States Patent [19]

Thaung et al.

[11] Patent Number: 4,615,513
[45] Date of Patent: Oct. 7, 1986

[54] FLEXIBLE, FORCE-TRANSMITTING ELEMENT
[75] Inventors: Kurt I. Thaung; Curt I. Carlsson, both of Växjö, Sweden
[73] Assignee: Volvo BM AB, Eskilstuna, Sweden
[21] Appl. No.: 606,517
[22] Filed: May 3, 1984
[30] Foreign Application Priority Data
  May 5, 1983 [SE] Sweden ............................ 8302573
[51] Int. Cl.$^4$ .............................................. F16F 1/36
[52] U.S. Cl. .................................. 267/63 R; 267/141
[58] Field of Search ............. 267/63 R, 141, 141.1, 267/141.2, 141.5, 153

[56] References Cited
U.S. PATENT DOCUMENTS

| 1,671,764 | 5/1928 | Dickey ........................... 267/63 R |
| 1,850,289 | 3/1932 | Saurer ........................... 267/141 X |
| 1,924,237 | 8/1933 | Glascodine ..................... 267/63 R |
| 2,044,649 | 6/1936 | Swennes et al. ............... 267/63 R X |
| 3,625,501 | 12/1971 | Hein et al. ..................... 267/141 X |

FOREIGN PATENT DOCUMENTS
  628896 11/1961 Italy .................................... 267/141

Primary Examiner—Duane A. Reger
Attorney, Agent, or Firm—Young & Thompson

[57] ABSTRACT

The invention relates to a flexible, force-transmitting element, especially a resilient element for transmitting compression and tensile forces between two relatively movable components, especially between an axle and the end of a bogie pivot beam pivotally supported in a vehicle frame. The element comprises two end plates which are essentially parallel when the element is unloaded, a cylindrical, preferably solid, rubber body disposed between the end plates, and a mechanical connecting means which permits limited relative movement between the end plates. According to the invention, the connecting means comprises a link element disposed in the rubber body, said link element being movably mounted at both ends in a holder element fixed in the respective end plate.

6 Claims, 3 Drawing Figures

FLEXIBLE, FORCE-TRANSMITTING ELEMENT

The present invention relates to a flexible, force-transmitting element, especially a resilient element for transmitting compression and tensile forces between two relatively movable components, especially between an axle and the end of a bogie pivot beam pivotally supported in a vehicle frame, said element comprising two end plates which are essentially parallel when the element is unloaded, a cylindrical rubber body disposed between the end plates, and a mechanical connecting means arranged to limit the relative separation of the end plates.

A flexible, force-transmitting resilient means of this type is previously known in which the connecting means between the end plates consists of a chain with a plurality of interlocking link elements extending through a central hole in the rubber body, the end links of the chain being threaded through respective holes in the end plates and locked thereto by means of a lock pin inserted in the end link under a certain compression and pretensioning of the rubber body. Such a connecting means limits the mutual separation of the end plates thereby preventing tensile stresses in the rubber body, and the connecting means can approximate an S- or arc-shape which the center line of the rubber body attempts to assume when the plates are displaced laterally and/or are set at an angle to each other. This connecting means consisting of a plurality of link elements can not, however, prevent undesired buckling, i.e. a marked one-sided bulging of the rubber body when the resilient device is, for example, subjected to powerful compression with oblique end plates, which can cause the entire element to collapse. Furthermore, in this design the rubber has a tendency during powerful compression of the resilient device to be forced out through the holes for the end links in the end plates, with the result being that already after a relatively short period of use it will collapse and be unusable.

A flexible, force-transmitting resilient device is also known, in which the connecting means between the end plates consists of a straight, rigid rod element, which is fixed in the end plates and extends through a hole in the rubber body and out through a hole in each end plate. This design is such that the rod element limits the separation of the end plates and prevents an undesirable buckling out of the rubber body, but the rigid rod element cannot assume the S-shape or arc-shape which the center line of the rubber body attempts to assume when there is lateral displacement and/or relative angular displacement of the end plates, which causes undesirable, life-shortening deformations and stresses on the rubber body. As in the design where the connecting means comprises a plurality of chain links, this design has the substantial disadvantage that the through-hole in the end plates necessary for the displacement and swinging movements of the rod causes undesirable and unavoidable pressing out of the rubber through the hole when there is powerful compression of the force-transmitting resilient device, with the result that it will collapse and be unusable after a short period of use. Another disadvantage of the rod element is that depending on the size and the direction of the load absorbed, it will stick out of the end plates in various directions and distances, and the projecting rod can be easily subjected to external damage.

One purpose of the present invention is to remove the disadvantages of the known devices and achieve an improved force-transmitting element which at the same time fulfills the following requirements:

(a) The connecting means must limit the separation of the end plates.

(b) The connecting means must prevent buckling of the rubber body.

(c) The connecting means must be able to approximate the S-shape or arc-shape which the centerline of the rubber body attempts to assume upon compression of the resilient device during relative lateral displacement and/or angular displacement of the end plates.

(d) Pressing out of the rubber through the through-holes in the end plates must be prevented.

To achieve these improvements, the force-transmitting element described by way of introduction is characterized in that the connecting means comprises a rigid link element disposed in the rubber body, said link element being mounted at both ends in holder elements fixed in the respective end plates so as to be pivotable in two mutually perpendicular planes and be axially displaceable in at least one of said holder elements.

Additional specific features of the force-transmitting element according to the invention are revealed in the subsequent dependent claims.

A preferred embodiment of the flexible, force-transmitting element according to the present invention is described in more detail below with reference to the accompanying drawing.

Figure 1:
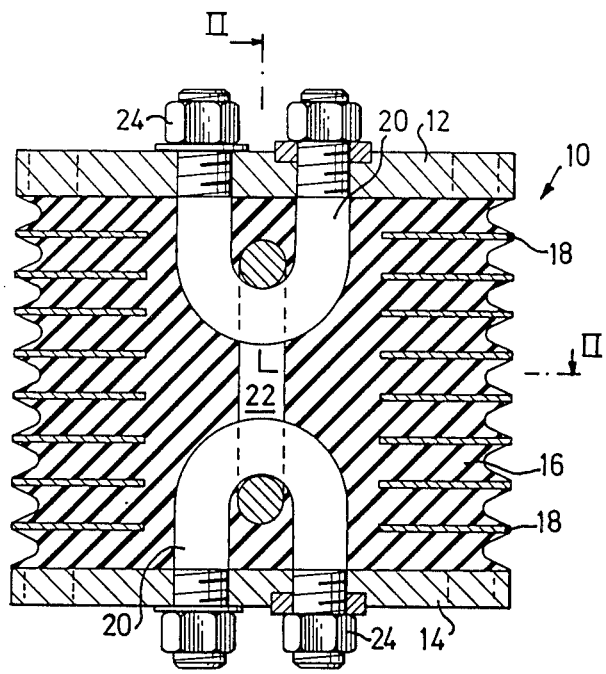
FIG. 1 is an axial cross-sectional view through the force-transmitting element according to the invention.
Figure 2:
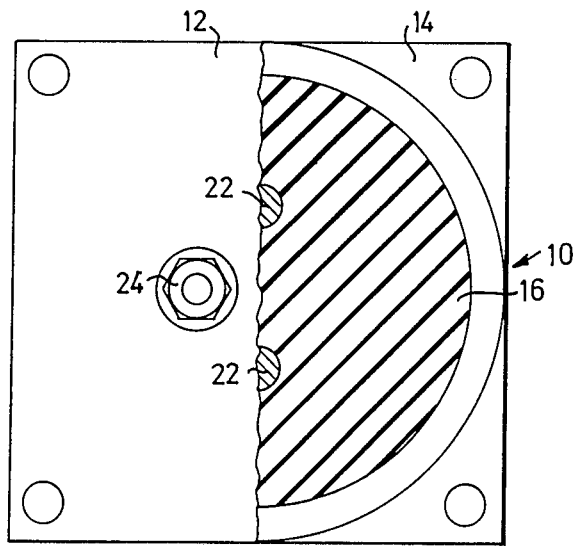
FIG. 2 is a plan view of the element, partially in section along the line II—II in FIG. 1.

The force-transmitting resilient element according to the invention, generally designated 10, designed to be mounted between an axle and one end portion of a bogie pivot beam pivotally mounted in a vehicle frame, comprises two end plates 12 and 14 which are essentially parallel to each other when the resilient element is unloaded, a solid cylindrical rubber body 16 vulcanized therebetween, the shape of which is stiffened in a known manner by means of a plurality of parallel, spaced, flat metal rings 18 to prevent circumferential bulging out of the rubber body 16 when the essentially parallelly oriented end plates are pressed together.

The end plates 12 and 14 are also held together by means of a mechanical connecting means in the form of holders 20 extending into the rubber body 16 from the central portion of the respective end plate 12,14, and secondly a link element 22 linked to the holders 20. In the preferred embodiment of the invention shown, each of the holders is in the form of a U-shaped shackle 20, the ends of which are securely fixed by means of nuts 24 in the respective end plate 12,14. Furthermore, the link element consists of a single annular chain link 22 which movably interlocks with the U-shackles 20.

The connecting means constructed in this manner provides a predetermined maximum expansion of the resilient element 10, i.e. a maximum separation of the end plates 12 and 14 when the resilient element 10 is subjected to a tensile force. The connecting means also prevents uncontrolled buckling, i.e. excessive one-sided bulging out of the rubber body 16 when the resilient element is, for example, subjected to powerful compression with the end plates at an angle to each other. The connecting means can also approximate the natural shape which the centerline of the rubber body 16 attempts to assume upon relative lateral displacement and/or angular displacement of the end plates. This significantly extends the life of the resilient element. A significant feature of the resilient element 10 according to the invention is that the end plates have no open through-holes through which the rubber of the rubber body 16 can be pressed out and thus destroyed during heavy compression of the element 10. This also contributes to increasing the life of the element.

Figure 3:
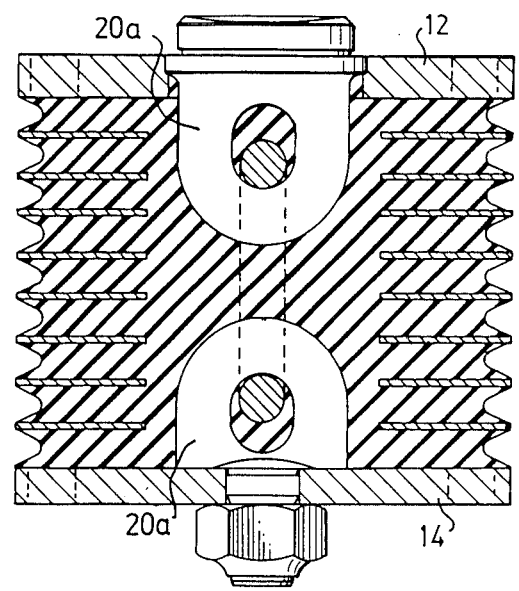
FIG. 3 is an axial cross-sectional view of a further embodiment of the force-transmitting element according to the invention.

In an alternative embodiment of the connecting means, shown in FIG. 3 each holder element has the form of an annular element 20a with a single shank portion which is sealingly fixed in the respective end plate.

Although the rubber body 16 is shown as a solid rubber body in which the connecting means 20,22 have been cured, it is also conceivable within the scope of the invention to house the connecting means in a central hole in the rubber body 16.

We claim:

1. Flexible, force-transmitting element, especially a resilient element for transmitting compression and tensile forces between two relatively movable components, especially between an axle and the end of a bogie pivot beam pivotally supported in a vehicle frame, said element comprising two end plates which are essentially parallel when the element is unloaded, a cylindrical rubber body disposed between the end plates, and a mechanical connecting means arranged to limit the relative separation of the end plates, characterized in that the connecting means comprises a rigid link element which consists of a single annular chain link disposed in the rubber body, said rigid link element being mounted at both ends in holder elements fixed in the respective end plates so as to be pivotable in two mutually perpendicular planes and be axially displacement in at least one of said holder elements.

2. Force-transmitting element according to claim 1, characterized in that each holder element has the shape of a U-shaped shackle projecting into the rubber body, the ends of said shackle being fixed to the respective end plate.

3. Force-transmitting element according to claim 1, characterized in that each holder element has the shape of a ring element with a single shank portion which is sealingly fixed in the respective end plate.

4. Force-transmitting element according to claim 1, characterized in that the connecting means is disposed centrally in the rubber body.

5. Force-transmitting element according to claim 1, characterized in that the rubber body is stiffened with a plurality of parallel, spaced, annular discs having outer peripheries near the periphery of the rubber body.

6. Force-transmitting element according to claim 1, characterized in that the connecting means is cured inside a rubber body preferably made as a solid piece.

* * * * *